(12) United States Patent
Nakamura et al.

(10) Patent No.: US 12,535,451 B2
(45) Date of Patent: Jan. 27, 2026

(54) SAMPLE HOLDER FOR DETECTION OF HYDROGEN PERMEATION AND HYDROGEN PERMEATION AND DIFFUSION PATH OBSERVATION DEVICE

(71) Applicant: NATIONAL INSTITUTE FOR MATERIALS SCIENCE, Tsukuba (JP)

(72) Inventors: Akiko Nakamura, Tsukuba (JP); Taro Yakabe, Tsukuba (JP); Naoya Miyauchi, Tsukuba (JP)

(73) Assignee: NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 378 days.

(21) Appl. No.: 18/028,862

(22) PCT Filed: Aug. 19, 2021

(86) PCT No.: PCT/JP2021/030476
§ 371 (c)(1),
(2) Date: Mar. 28, 2023

(87) PCT Pub. No.: WO2022/070661
PCT Pub. Date: Apr. 7, 2022

(65) Prior Publication Data
US 2023/0333032 A1    Oct. 19, 2023

(30) Foreign Application Priority Data
Sep. 29, 2020    (JP) .................... 2020-164186

(51) Int. Cl.
*G01N 27/404*    (2006.01)
(52) U.S. Cl.
CPC .................. *G01N 27/404* (2013.01)
(58) Field of Classification Search
USPC ........................................................ 250/310
See application file for complete search history.

(56) References Cited

U.S. PATENT DOCUMENTS

2003/0010634 A1 * 1/2003 Lewis, II ............... G01N 17/02
                                                          205/775.5
2013/0213439 A1    8/2013 Zandbergen et al.

FOREIGN PATENT DOCUMENTS

JP    2013-171836 A    9/2013
JP    2017-187457 A    10/2017
(Continued)

OTHER PUBLICATIONS

The text of WO-2019226661-A1 Devices and methods for in situ hydrogen charging. (Year: 2019).*
(Continued)

*Primary Examiner* — Kiet T Nguyen
(74) *Attorney, Agent, or Firm* — WHDA, LLP

(57) ABSTRACT

The sample holder 30 comprises: a holder body 31 for holding the sample 17; an electrolyte introduction chamber 31b provided with an opening 31c that opens to a measurement region 17a of the sample; a retainer plate 33, which is provided with a through-hole 33a corresponding to the measurement region of the sample, for retaining the sample from the electron source side around the through-hole to sandwich the sample airtightly with the holder body; double sealing members 32 arranged between the surface of the holder body and the sample so as to surround the periphery of the measurement region of the sample; a differential exhaust pipe 35, which opens to a space between the sealing members on the surface of the holder body, for exhaust the space through the opening; and electrodes 19 for electrolysis made up of a bias application electrode 19a and an opposing electrode 36.

14 Claims, 13 Drawing Sheets

(56) References Cited

FOREIGN PATENT DOCUMENTS

JP          2019-145255 A       8/2019
WO     WO-2019226661 A1 *  11/2019    .........  G01N 23/2251

OTHER PUBLICATIONS

Koyama et al., "In situ observations of silver-decoration evolution under hydrogen permeation: Effects of grain boundary misorientation on hydrogen flux in pure iron", Scripta Materialia, 2017, 129, pp. 48-51, cited in Specification (4 pages).
Miyauchi et al., "Observation of Metal Surface by Operando Hydrogen Microscope", Vacuum and Surface Science, 2019, vol. 62, No. 1, pp. 27-32, w/English abstract, cited in ISR (6 pages).
International Search Report dated Nov. 16, 2021, issued in counterpart International Application No. PCT/JP2021/030476 (2 pages).

* cited by examiner

SAMPLE HOLDER FOR DETECTION OF HYDROGEN PERMEATION AND HYDROGEN PERMEATION AND DIFFUSION PATH OBSERVATION DEVICE

TECHNICAL FIELD

The present invention relates to a sample holder for holding a sample for detection of hydrogen permeation, and a hydrogen permeation and diffusion path observation device for measuring hydrogen that permeates this sample, and in particular, the sample holder that holds a plate-shaped sample in a state where the plate-shaped sample can be brought in and taken out of an analysis chamber when hydrogen atoms that have permeated from the back surface of the plate-shaped sample and have been discharged from the surface of the sample are observed, and the hydrogen permeation and diffusion path observation device for measuring hydrogen ions by using this sample holder.

BACKGROUND ART

To detect hydrogen that permeates a sample, a hydrogen permeation and diffusion path observation device disclosed in Patent Literature 1, for example, has conventionally been used. This hydrogen permeation and diffusion path observation device is provided with a scanning electron microscope. The scanning electron microscope includes an analysis chamber, a diaphragm-type vacuum vessel, to which the sample is mounted, a hydrogen pipe that is connected to the diaphragm-type vacuum vessel to supply hydrogen to the back surface of the sample, etc. The sample serves as the diaphragm that divides the analysis chamber from a hydrogen chamber housing hydrogen in the diaphragm-type vacuum vessel. With this observation device, by scanning an electron beam across the sample, a scanning electron microscopic image (SEM image) on the surface of the sample is acquired. At the same time, the hydrogen that is discharged from the surface of the sample is excited by the electron beam, and turns into hydrogen ions, which desorb from the surface (referred to as electron-stimulated desorption (ESD), and thus an ESD image by hydrogen ions is obtained together with the SEM image.

With such a hydrogen permeation and diffusion path observation device, the hydrogen gas is supplied from the back surface of a thin plate-like sample, and the hydrogen that permeates from the surface of the sample into an ultra-high vacuum vessel is made to desorb, induced by electronic transitions (electron-stimulated desorption (ESD), and the permeation position is measured. As described above, with this observation device, the sample serves as the diaphragm that divides the analysis chamber from the hydrogen chamber. By introducing the hydrogen gas into the hydrogen chamber on the back side of the sample, the hydrogen gas is made to permeate the sample that serves as the diaphragm, and discharged from the surface side of the sample. Ultra-high vacuum in this case is the atmosphere on the order of $10^{-8}$ Pa, for example.

By the way, with the method of observing hydrogen permeation through a sample using hydrogen gas, since the amount of introduction of hydrogen into the sample is relatively small, and thus the intensity of hydrogen signal for hydrogen permeation detection is low, the measurement time becomes long, and the signal-to-noise ratio becomes low. From the viewpoint of increasing the amount of introduction of hydrogen, thereby increasing the signal intensity of permeating hydrogen, a method of introducing hydrogen ions, instead of hydrogen gas, within a solution by using electrochemical method is also considered.

Meanwhile, Patent Literature 2 discloses a method of supplying hydrogen from electrolyte to a thin plate-like sample in the atmosphere. Also, solution cells used for electron microscope in a medium- to high-vacuum environment have been commercialized as those for SEM images and for transmission electron microscope images (TEM images), but they cannot be used in an ultra-high vacuum environment.

CITATION LIST

Patent Literature

Patent Literature 1: JP 2017-187457 A
Patent Literature 2: M. Koyama, et. al/Scripta Materialia 129 (2017) pp. 48-51

SUMMARY OF INVENTION

Problem to be Solved by the Invention

The existing solution cells can be used in low- and high-vacuum environments. However, since water, nitrogen, etc. as well as hydrogen gas remain in low- and high-vacuum environments, they are not suitable for use in an ultrahigh-vacuum environment intended for measurement of hydrogen.

Furthermore, to remove the effect of water in hydrogen measurement in the ultra-high vacuum environment, it is necessary to heat and degas i.e. baking the vacuum vessel, the sample holder, and the sample. Therefore, it is necessary for the vacuum vessel, the sample holder, and the sample to have heat resistance of approximately 120° C., and also the electrolyte must be removed before performing baking.

It is also necessary to supply hydrogen by using a solution cell that has sufficient air-tightness in order not to disturb the ultra-high vacuum environment necessary for hydrogen measurement.

Measures must also be taken to prevent damage to the sample and the sample holder. Therefore, it is necessary to connect a solution pipe externally to the vacuum vessel so as to allow air bubbles generated from the solution during electrolytic treatment to be discharged, thus making the solution circulate, or provide a gas pipe that connects the electrolyte introduction chamber externally to the vacuum vessel so as to allow air bubbles to be discharged from the electrolyte introduction chamber within the sample holder.

As described above, to detect electrochemical charge-type hydrogen permeation by using electrolyte in the ultra-high vacuum environment, the following conditions must be satisfied: there is no emission of gases that disturb the ultra-high vacuum environment; the sample can endure baking at the temperature of 100° C. or higher; hydrogen can be introduced electrochemically from the back surface of the sample into the sample; electrodes must be arranged in a small space and the electric potential of the sample can be altered in order not to affect the hydrogen ions to be measured; and the gas generated during electrolytic treatment can be discharged.

To solve the above problems, one of the objectives of the present invention is to provide a sample holder for detection of electrochemical charge-type hydrogen permeation using electrolyte intended for an ultra-high vacuum environment. The other objective of the present invention is to provide a hydrogen permeation and diffusion path observation device for measuring hydrogen ions that have permeated the sample held by this sample holder.

Means for Solving the Problem

To achieve one of the objectives of the present invention, the electrochemical charge-type sample holder for detection of hydrogen permeation according to the present invention comprising:
a holder body to be mounted to a scanning electron microscope for holding a sample to detect hydrogen ions generated by the electron beam irradiation;
an electrolyte introduction chamber provided with an opening that opens to a measurement region of the sample;
a retainer plate, which is provided with a through-hole that corresponding to the measurement region of the sample, for retaining the sample from the electron source side of the scanning electron microscope around the through-hole to hold the sample airtightly against the holder body;
double sealing members arranged between the surface of the holder body and the sample so as to surround the periphery of the measurement region of the sample;
a differential exhaust pipe, which opens to a space between the double sealing members on the surface of the holder body, for exhaust from the opening; and
electrodes made up of a bias application electrode and an opposing electrode for electrolysis, wherein
the retainer plate made of a conducting material as the bias application electrode, the opposing electrode is disposed within the electrolyte introduction chamber, and a voltage is applied between the bias application electrode and the opposing electrode to introduce hydrogen from the electrolyte into the sample.

According to the hydrogen permeation and diffusion path observation device of the present invention, by allowing the surface of the holder body to abut against the retainer plate airtightly while holding the sample via the double sealing members, and by exhausting the circular space defined by the double sealing members, the ultra-high vacuum state within the analysis chamber is maintained without fail, and the discharge of gas from the sample holder side to the analysis chamber side is prevented. Also, by applying the voltage to the electrolyte between the retainer plate as the bias application electrode and the opposing electrode, large amounts of hydrogen ions are generated from the electrolyte, the hydrogen ions are attracted toward the retainer plate, and the hydrogen is introduced into the sample electrochemically, which is why the amount of introduction of hydrogen to the sample is larger compared to the conventional vapor phase introduction of hydrogen into the sample. Since the intensity of signal of hydrogen that have permeated thus becomes large, the time required for detection of hydrogen permeation becomes short, and at the same time the signal-to-noise ratio of the detection result becomes high. It is also possible to detect hydrogen permeation even for samples where the hydrogen permeation measurement falls below the measurement limit with the conventional hydrogen gas-based introduction of hydrogen.

By creating the electrolyte introduction chamber with an opening that opens to the surface of the holder body, and a hollow part that extends from the opening towards inside of the holder body, providing an insulation and an anticorrosive coating to the inner face of the hollow part, and disposing the opposing electrode within the hollow part, the hollow part allows a large amount of electrolyte to be used for electrolysis, increasing the amount of hydrogen to be introduced to the sample and improving hydrogen introduction efficiency.

By defining the electrolyte introduction chamber with the back surface of the sample, the inner sealing member of the double sealing members, and the surface of the holder body, the sample holder can be made more compact because the electrolyte introduction chamber is created, on the surface of the holder body, with the back surface of the sample and the inner sealing member. In this embodiment, it is only necessary to connect the opposing electrode to the holder body.

The sample holder is provided with a feed pipe for supplying electrolyte to the electrolyte introduction chamber and an exhaust pipe for discharging used electrolyte. Consequently, even when electrolysis progresses, new electrolyte can be supplied to the electrolyte introduction chamber continuously at all times, and even if air bubbles are generated unintentionally by electrolysis, they can be discharged to outside together with the electrolyte via the exhaust pipe, and thus the effect of air bubbles on electrolysis can be eliminated.

Provided that the holder body, the opposing electrode, the electrolyte introduction chamber, and the sealing members are made of materials that can endure baking, by baking the holder body, the opposing electrode, the electrolyte introduction chamber, and the sealing members prior to hydrogen permeation detection at a temperature of 100° C. or higher, thereby removing water content, hydrogen permeation detection can be performed without fail. By allowing the holder body made of a conductive material to serve as the opposing electrode, it is unnecessary to separately provide an opposing electrode, which decreases parts and assembly costs.

It is also possible that by allowing the hollow part of the electrolyte introduction chamber to open to the back side of the holder body, sealing this open end by a cover member via an ultra-high vacuum seal, and holding a vessel that serves as the electrolyte introduction chamber to the surface side of the cover member with an elastic member, the open end of the vessel is made to abut against the back surface of the sample within the sealed hollow part by the biasing force of the elastic material.

According to the above configuration, since the outer region of the vessel is not in vacuum, the feed pipe, the exhaust pipe, the opposing electrode, and the wiring, etc. can be of general products not giving consideration to the state of vacuum, which decreases the entire material cost. Also, by removing the cover member from the holder body, the maintenance of the feed pipe, the exhaust pipe, the opposing electrode, and the wiring, etc. can be performed.

The hydrogen permeation and diffusion path observation device according to the present invention comprises:
a scanning electron microscope for detecting secondary electrons generated by irradiating a sample with an electron beam;
a sample holder for detection of hydrogen permeation that is mounted to the scanning electron microscope to hold the sample for detecting hydrogen ions generated by irradiation of the electron beam; and
a hydrogen ion detector for detecting hydrogen ions generated by the electron beam shot on hydrogen that is discharged to the surface from the back face of the sample held by the sample holder, wherein
the sample holder comprises: a holder body; a retainer plate for holding the sample from the surface side of the holder body; a differential exhaust pipe that opens to a space between sealing members on the surface of the holder body and communicates with outside; and electrodes made up of a bias application electrode and an opposing electrode for electrolyzing the electrolyte, the holder body comprises:

an electrolyte introduction chamber provided with an opening that opens at least to the measurement region of the sample;

electrolyte that fills the electrolyte introduction chamber up to the back surface of the sample; and double sealing members arranged on the surface of the sample holder body so as to surround the periphery of the measurement region of the sample, the retainer plate is provided with a through-hole that corresponds to the measurement region of the sample, presses down the sample from the electron source side around the periphery of the through-hole, and thus sandwiches the sample airtightly between the sample holder and the double sealing members, and the entire electrolyte introduction chamber is sealed with the retainer plate in a state where the electrolyte has been introduced into the electrolyte introduction chamber and the sample is mounted to the sample holder, the retainer plate is made to serve as a bias application electrode, and at the same time, the opposing electrode is disposed within the electrolyte introduction chamber, a voltage is applied between the electrodes to cause electrolysis to occur, and by irradiating the hydrogen discharged to the surface from the back surface of the sample held by the sample holder with the electron beam, hydrogen ions generated by the electron beam are measured by the hydrogen ion detector. The sample holder is in the same configuration as the above-mentioned sample holder that achieves one of the objectives of the present invention.

Effects of Invention

According to the present invention, a sample holder for electrochemical charge-type hydrogen permeation detection using electrolyte in an ultra-high vacuum environment can be provided and a hydrogen permeation and diffusion path observation device for obtaining a SEM image and an ESD image highly accurately by measuring hydrogen ions that permeate the sample held by this sample holder can be provided.

EMBODIMENTS OF THE INVENTION

Figure 1:
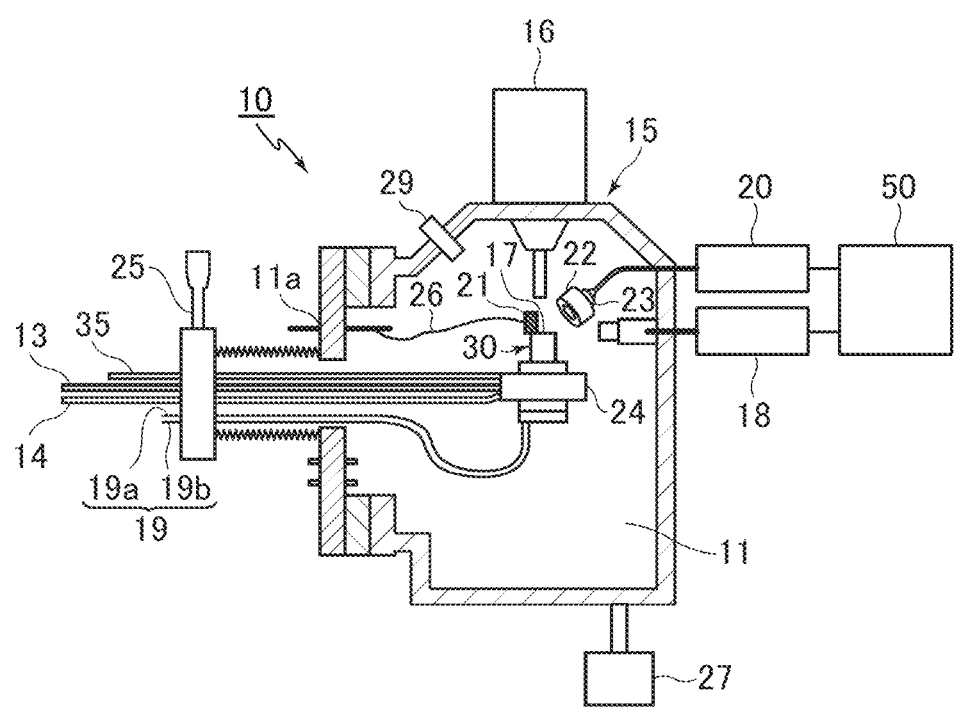
FIG. 1 is a partial cross-sectional view schematically showing a hydrogen permeation and diffusion path observation device according to the present invention for detecting permeation of hydrogen through a sample by using a sample holder for detection of hydrogen permeation.

The present invention will hereinafter be described in detail by referring to the drawings based on some of the embodiments. Please understand, however, that those embodiments are just some examples to describe the present invention and do not limit the scope of the protection of the present invention.

First, the overall structure of a hydrogen permeation and diffusion path observation device, which uses a sample holder 30 for detection of hydrogen permeation according to the present invention (hereinafter called as the sample holder) to detect permeation of hydrogen through a sample 17 held by this sample holder 30, will be described.

Figure 2:
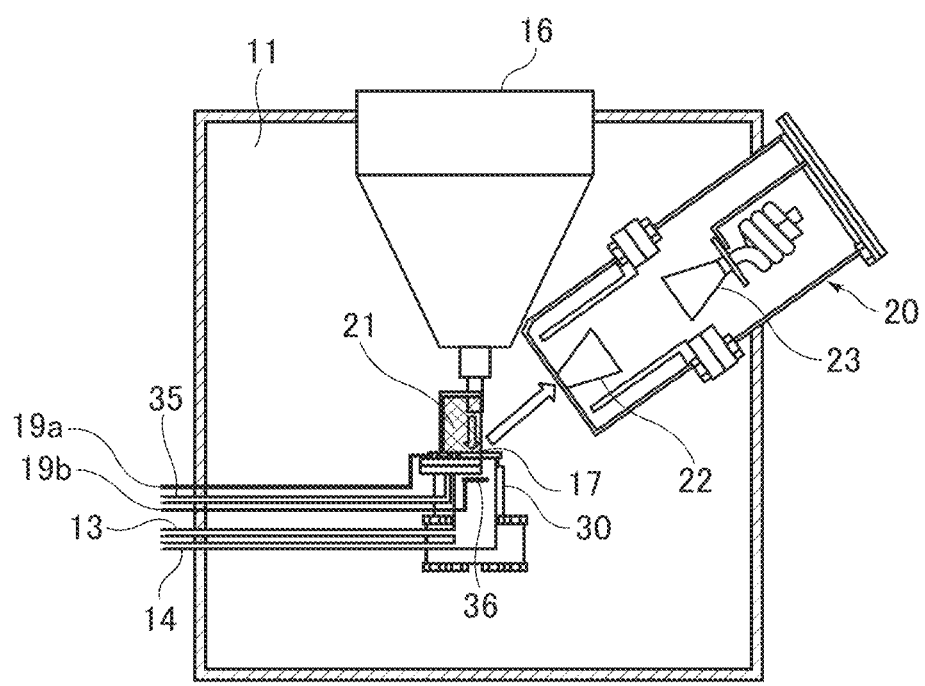
FIG. 2 is a partial magnified view showing a hydrogen ion detector arranged within an analysis chamber of a scanning electron microscope of the hydrogen permeation and diffusion path observation device.

FIG. 1 schematically shows the hydrogen permeation and diffusion path observation device 10, and FIG. 2 shows a hydrogen ion detector 20 arranged within an analysis chamber 11 of a scanning electron microscope 15 of the hydrogen permeation and diffusion path observation device 10. The hydrogen permeation and diffusion path observation device 10 mainly includes the scanning electron microscope 15, the hydrogen ion detector 20, and the sample holder 30 arranged in the analysis chamber 11 of the scanning electron microscope 15 in an insertable/drawable state, and the sample 17 is placed on the top of the sample holder 30.

The scanning electron microscope 15 is provided with analysis chamber 11, and an electron source 16 for emitting an electron beam the sample 17, which is placed on the sample holder 30 inserted into the analysis chamber 11, with an electron beam. The analysis chamber 11 includes a secondary electron detector 18 for detecting the secondary electrons generated as the result of the sample 17 being irradiated with the electron beam 16a generated from the electron source 16, and the hydrogen ion detector 20 for detecting hydrogen ions generated by emitting the electron beam 16a. A control unit 50 for controlling the detector is connected to the hydrogen ion detector 20. Furthermore, to the analysis chamber 11, a sample temperature measuring unit 26 for measuring the temperature of the sample 17 is provided. As the sample temperature measuring unit 26, a thermocouple, etc. are used, and their conducting wire is connected to a conducting wire draw-out port 11a provided on the outer wall of the analysis chamber 11. A mass analyzer 29, etc. for analyzing residual elements may be arranged within the analysis chamber 11. The mass analyzer 29 is a quadruple mass analyzer, for example. It is necessary to evacuate the analysis chamber 11 of the canning electron microscope 15 to a degree of vacuum that allows a SEM image to be obtained, $1.0 \times 10^{-7}$ Pa or lower, for example. To achieve this degree of vacuum, an evacuation unit 27 is connected to the analysis chamber 11. The evacuation unit 27 is provided with a vacuum pump such as a turbo molecular pump, gate valve, vacuum gauge, etc. (not shown).

The sample holder 30 includes: a bias voltage feed wiring 19; a differential exhaust pipe 35; and a feed pipe 13 and an exhaust pipe 14 connected to the back side of the sample 17 to feed and discharge electrolyte. The entire sample holder 30 is disposed in the hydrogen permeation and diffusion path observation device 10 in a state where it is inserted into or drawn out of the device through a gateway provided at a desired position such as a side wall or bottom face of the analysis chamber 11. The sample holder 30 is arranged on a sample stage 24 within the analysis chamber 11, and the position of the sample stage 24 is adjusted by a sample position adjusting unit 25. The sample 17 is placed on the top surface of the sample holder 30, and placed immediately below the electron source 16, facing the electron source, within the analysis chamber 11 of the scanning electron microscope 15 together with the sample holder 30. The structure of the sample holder 30 will be described in detail later.

FIG. 2 shows the details of the hydrogen ion detector 20. The hydrogen ion detector 20 detects hydrogen ions generated on the surface of the sample 17 by the ESD process, obtaining a hydrogen ion-based two-dimensional image by scanning the electron beam 16a (shown in FIG. 7) from the electron source 16 across the sample 17. This is called an ESD image or an ESD map. In this embodiment, the hydrogen ion detector 20 includes a collecting mechanism 21 for collecting hydrogen ions generated on the surface of the sample 17 by electron beam scanning, an ion energy decomposing unit 22 for removing substances other than hydrogen ions, and an ion detector 23 for detecting hydrogen ions that have passed through the ion energy decomposing unit 22.

The collecting mechanism 21 of the hydrogen ion detector 20 is arranged close to the surface side of the sample 17 in order to collect detached ions efficiently. The collecting mechanism 21 shown is a lens of a grid structure made of metallic wire mesh. The hydrogen ions collected by the collecting mechanism 21 enter to the ion energy decomposing unit 22, where they are sorted, and made to enter into the ion detector 23. The ion energy decomposing unit 22 is made of metal electrodes in a lid structure to prevent the ion detector 23 from directly facing the sample 17. As the ion energy decomposing unit 22, electrodes in cylindrical or conical structures can be used. The ion energy decomposing unit 22 allows an appropriate positive voltage to be applied to a cylindrical electrode, introduces ions of a target gas, hydrogen ions only with the present invention, to the ion detector 23 by the electric field, and thus removes light and electrons generated by emitting the electron beam 16a to the sample 17. As the ion detector 23, Ceratron or a secondary electron multiplier can be used, for example.

The hydrogen permeation and diffusion path observation device 10 in this embodiment is configured as described above, with a sample holder 30 arranged in a state insertable into or drawable from the analysis chamber 11 of the scanning electron microscope 15 of this device. A structural example of the sample holder 30 will hereinafter be described in detail by referring to FIGS. 3A, 3B, and 4. As shown in each figure, the sample holder 30 includes a holder body 31, sealing members 32 arranged on the surface of the holder body 31, and a retainer plate 33 placed on the surface of the holder body 31 so as to sandwich the sample 17 from above.

(Structure of the Holder Body 31)

Since the holder body 31 is required to keep the amount of hydrogen gas discharged as small as possible, it is made of a material that can be used in an ultra-high vacuum environment such as stainless steel, copper, glass, and Teflon (registered trademark), and the entire body is configured in a cylindrical shape so as to endure a baking process performed at a temperature of 100° C. or higher, approximately 120° C., for example. This holder body 31 includes a hollow part that serves as an electrolyte introduction chamber 31b inside the peripheral wall. The top board of the electrolyte introduction chamber 31b is provided with an opening 31c that opens at the center, corresponding to the above-mentioned measurement region 17a of the sample 17, on the surface (also called top surface) of the holder body 31.

(Structure of the electrolyte introduction chamber 31b)

The electrolyte introduction chamber 31b is filled with electrolyte 34 up to the opening 31c during the processing time. At a position of an appropriate depth within the electrolyte introduction chamber 31b, an opposing electrode 36 of the bias voltage feed wiring 19, which will be described later, is arranged, and the bias voltage feed wiring 19b is connected from the holder body 31 to an external DC power supply. The inner surface of the electrolyte introduction chamber 31b created in the holder body 31 is provided with an insulation and an anticorrosion coating 31d to prevent corrosion caused by the electrolyte 34. This insulation and anticorrosion coating 31d is also made of a material that can endure baking performed at a temperature of 100° C. or higher. Since the insulation and anticorrosion coating 31d is not exposed to vacuum, Teflon (registered trademark) coating, for example, can be used.

(Structure of the Sealing Members 32)

On the surface, namely on the top surface, of the holder body 31, an opening 31c is provided. Two sealing members 32 are arranged concentrically at a given interval, surrounding the opening 31c. The region 32c between the double sealing members 32 is arranged so as to have an approximately uniform width. The double sealing members 32 are made of an elastomer seal, for example. Specifically, they are arranged as large- and small-diameter double O-rings surrounding the opening 31c formed on the surface of the holder body 31. The inner O-ring 32b is in a circular shape having a diameter slightly smaller than the measurement region 17a of the sample 17, and the outer O-ring 32a, which is in a circular shape having a diameter larger than that of the inner O-ring, is placed at a given distance from the inner O-ring.

As the two O-rings 32a, 32b, known O-rings for a vacuum environment are respectively used. For example, fluorine-containing rubber such as Viton (registered trademark) and Kalrez (registered trademark) may be used, provided that both O-rings 32a, 32b are made of a material that can also endure baking performed at a temperature of 100° C. or higher. For the outer O-ring 32a, of those two O-rings 32a, 32b, a material having especially high insulation performance is selected, and the inner diameter of 11 mm is selected, for example. The inner diameter of the inner O-ring 32b is made to be 4 mm, for example, and since it is exposed to the electrolyte 34, a material having especially high insulation and anticorrosion performance is used. In the case shown, each O-ring 32a, 32b of the sealing members 32 is respectively positioned so as to be fitted in the matching groove provided on the surface of the holder body 31. The two matching grooves are formed wider than the ring diameter of the O-rings 32a, 32b, and each O-ring 32a, 32b is embedded into those matching grooves.

(Setting of the Sample 17)

Prior to measurement, the sample 17 is placed on the surface (top surface) of the sample holder 30 outside the hydrogen permeation and diffusion path observation device 10. In this case, the sample 17 is a thin plate made of a material such as metal, Si substrate, etc., steel and stainless steel, for example, and its thickness ranges approximately from 100 to 300 µm. Its diameter should be of a size larger than that of the sealing member 32a on the outer side of the double sealing members 32. This sample 17 is placed on the surface of the sample holder 30 so as to block the sealing members 32. The hollow part of the sample holder 30 is separated from the analysis chamber 11 by the sample 17, with the sample 17 serving as a diaphragm dividing the analysis chamber 11 from the hollow part. In the case of the dimension of the O-ring 32a stated above (inner diameter: 11 mm), the thickness of the sample 17 ranges approximately from 100 µm to 1 mm, and the diameter of the sample 17 is set to be 16 mm, for example.

(Structure of the Differential Exhaust Pipe 35)

Between the outer sealing member 32a and the inner sealing member 32b, an opening 35a is provided at a position on the surface of the holder body 31. A differential exhaust pipe 35, which communicates this opening 35a to outside through the peripheral wall of the holder body 31, is provided. Prior to measurement, the electrolyte introduction chamber 31b is evacuated to a degree of vacuum on the order of $10^{-4}$ Pa, for example, through this differential exhaust pipe 35.

(Structure of the Feed Pipe 13 and the Exhaust Pipe 14)

The feed pipe 13 and the exhaust pipe 14 for electrolyte 34 are provided at two positions at the top and the bottom on one side of the peripheral wall that constitutes the electrolyte introduction chamber 31b of the sample holder 30. During processing, the electrolyte 34 is circulated by being introduced through the feed pipe 13, and discharged as treated electrolyte 34 through the exhaust pipe 14. For the feed pipe 13 and the exhaust pipe 14, a material that can endure the above-mentioned baking and does not become eroded due to electrolyte 34, a heat-resistant Teflon (registered trademark) pipe, for example, is used and electrically insulated from the holder body 31.

(Structure of the Retainer Plate 33)

The sample 17 is covered with the retainer plate 33 of the sample holder 30. This retainer plate 33 is made of a plate-shaped conductive material that can endure baking performed at a temperature of 100° C. or higher as same as in the case of the holder body 31, stainless steel (SUS), for example. The retainer plate 33 has an area the same as, or slightly larger than, the diameter of the surface shape of the cylindrical sample holder 30, and has a through-hole 33a at the center. The opening area of this through-hole 33a approximately corresponds to the measurement region 17a of the sample 17. The through-hole 33a of the retainer plate 33 comes immediately above the measurement region 17a of the sample surface when the sample 17 is set to the sample holder 30, and is arranged concentrically, corresponding to the opening 31c of the electrolyte introduction chamber 31b of the holder body 31. To this retainer plate 33, wiring on the −side 19a, of the bias voltage feed wiring 19, is connected, and thus the retainer plate serves as a bias application electrode when electrolyte 34 fed to the electrolyte introduction chamber 31b of the holder body 31 undergoes electrolysis. The holder body 31 is electrically insulated via the insulation bushing 31a, pressed down airtightly, and fastened with screws 39, etc. in a state where the retainer plate 33 retains the sample 17 against the surface of the holder body. Macor (registered trademark), etc. may be used as the insulation bushing 31a.

(Structure of the Opposing Electrode 36)

Figure 4:
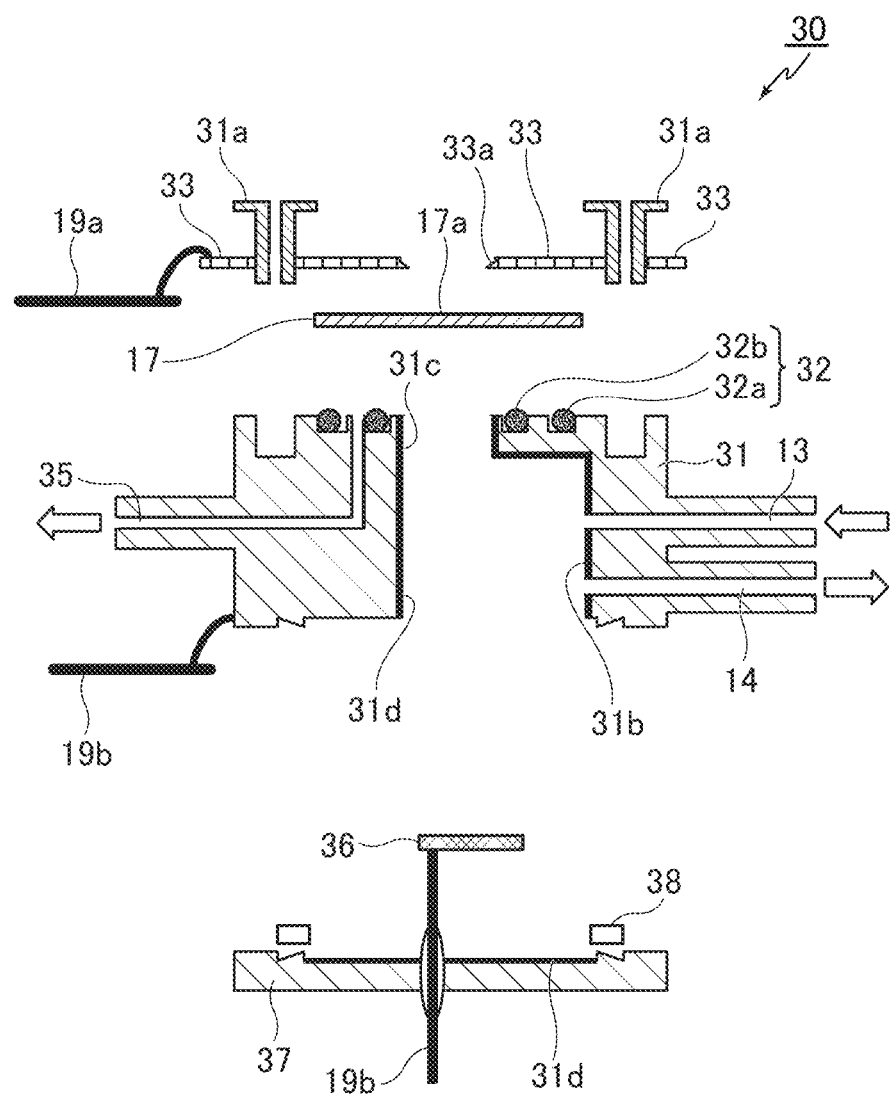
FIG. 4 is a schematic cross-sectional view showing the sample holder in FIG. 3A by breaking it down.

Against the retainer plate 33 as the bias application electrode, the opposing electrode 36 is disposed within the electrolyte introduction chamber 31b of the holder body 31, with the wiring on the +side 19b of the bias voltage feed wiring 19 connected to the opposing electrode. As the material of the opposing electrode 36, Pt, etc. may be used. In this case, the opposing electrode 36 is practically fastened to the cover member 37 as shown in the breakdown cross-sectional view as shown in FIG. 4. The cover member 37 is mounted to the holder body 31 airtightly at its open bottom side in attachable/detachable state via an ultra-high vacuum seal 38 such as a metal gasket, for example. The wiring on the +side 19b of the opposing electrode 36 is insulated, then made to go through the cover member 37, and connected to the DC power supply for feeding bias voltage. In this way, by connecting the retainer plate 33 as the bias application electrode to the opposing electrode 36 via the bias voltage feed wiring 19 to apply bias voltage, the electrolyte 34 fed to the hollow part 31b undergoes electrolysis, thus generating hydrogen ions. Although air bubbles may be generated within the electrolyte 34, accompanying electrolysis, they are discharged to outside through the exhaust pipe 14 together with the used electrolyte 34, and so electrolysis is not interrupted by such air bubbles.

As the electrolyte 34 for electrolysis, a 0.5M NaCl+0.04M NH$_4$SCN solution (2% NaCl+3 g/L NH$_4$SCN) is used, for example, and electrolysis is performed as constant current hydrogen charge at a current density of 1 mA/cm$^2$ at a room temperature. Or, as the electrolyte 34, 3% NaCl solution (0.75M NaCl)+3 g/L NH$_4$SCN are used, and electrolysis is performed at a current density of 6 A/m$^2$. The type of the electrolyte 34 and conditions for electrolysis can be selected as required according to the configuration of the sample 17. In this case, deuterium may also be generated instead of hydrogen by using heavy water, namely a deuterium oxide solution as the electrolyte 34 instead of the above solutions.

With the sample holder 30 in the first embodiment, the sample 17 is configured in vacuum-sealable state with the retainer plate 33 and the double sealing members 32a, 32b. As the electrolyte 34 filled in the electrolyte introduction chamber 31b undergoes electrolysis, hydrogen ions are generated. The generated hydrogen ions are attracted toward the retainer plate 33, to which bias voltage on the −side is applied, and then introduced into the sample 17. The hydrogen ions diffuse within the sample 17, gather together within the sample, reach the surface of the sample 17, and hydrogen is discharged from the surface of the sample 17. In other words, although hydrogen permeates from the back side to the surface side of the sample 17, by irradiating the hydrogen that has reached the surface of this sample 17 with an electron beam 16a, hydrogen ions are generated. By irradiating the generated hydrogen ions with the electron beam 16a, hydrogen ions are detached from the sample 17 due to electron-stimulated desorption (ESD). By collecting the hydrogen ions with the collecting mechanism 21, hydrogen ions are detected by the hydrogen ion detector 20.

How to acquire a SEM and an ESD images will then be described.

The control unit 50 acquires the SEM image created by secondary electrons generated from the sample 17 via scanning of electron beam 16a emitted from the electron source 16, and at the same time, turns hydrogen atoms discharged from point defects inside and on the surface of the sample 17 into hydrogen ions by electron-stimulated desorption (ESD), and acquires the ESD image of hydrogen ions in synchronization with the scanning of the electron beam.

The ESD is a phenomenon that occurs when emitted electrons hit the hydrogen atoms discharged from and existing on the surface of the material, where electrons within the hydrogen atoms turn into an excited state, or are stripped off, thus turning hydrogen atoms into ions. The state bonded on the surface is thus turned into antibonding state, causing desorption. The ESD image is acquired by shooting the detached hydrogen ions. By synchronizing the SEM image with the ESD image of the sample 17 by the control unit 50, the positional information of the detected hydrogen ions is obtained to detect the position of point defects of the sample 17.

Figure 5:
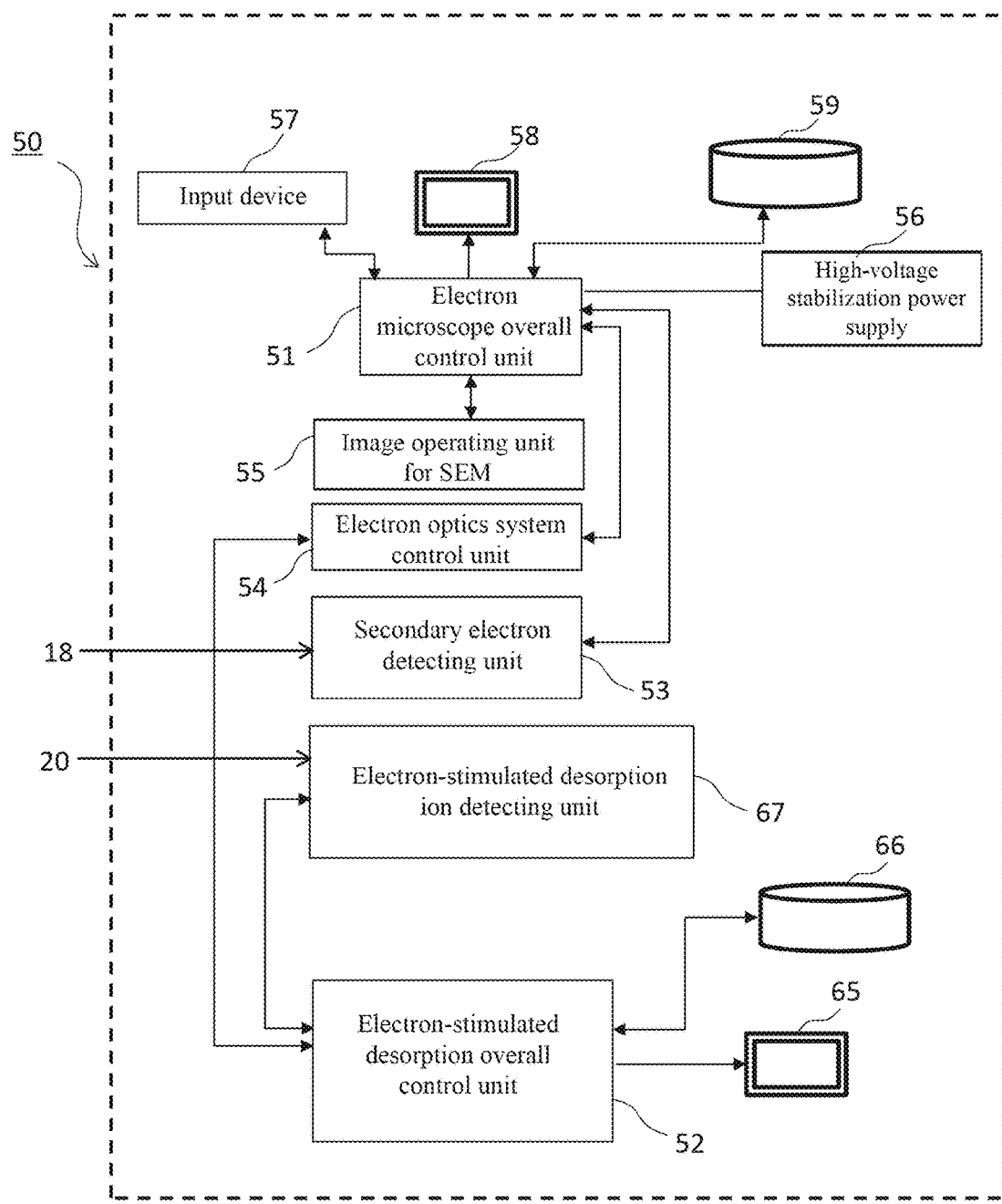
FIG. 5 is a block diagram showing the structure of a control unit of the hydrogen permeation and diffusion path observation device.
Figure 6:
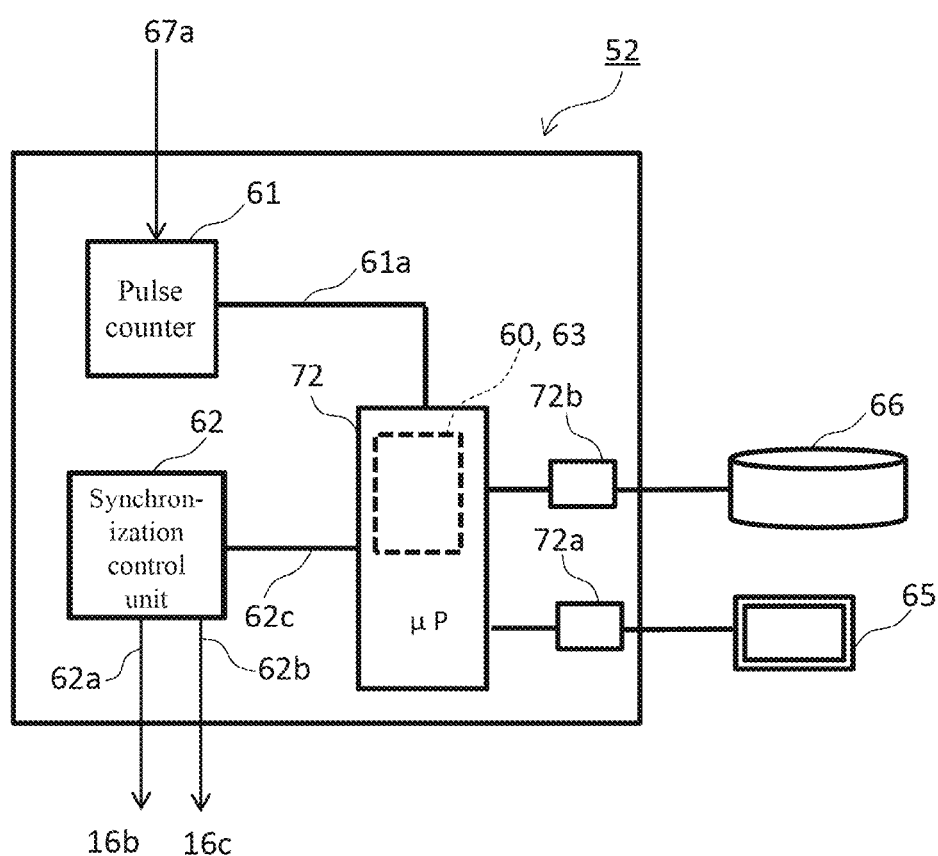
FIG. 6 is a block diagram showing the structure of an electron-stimulated desorption overall control unit.
Figure 7:
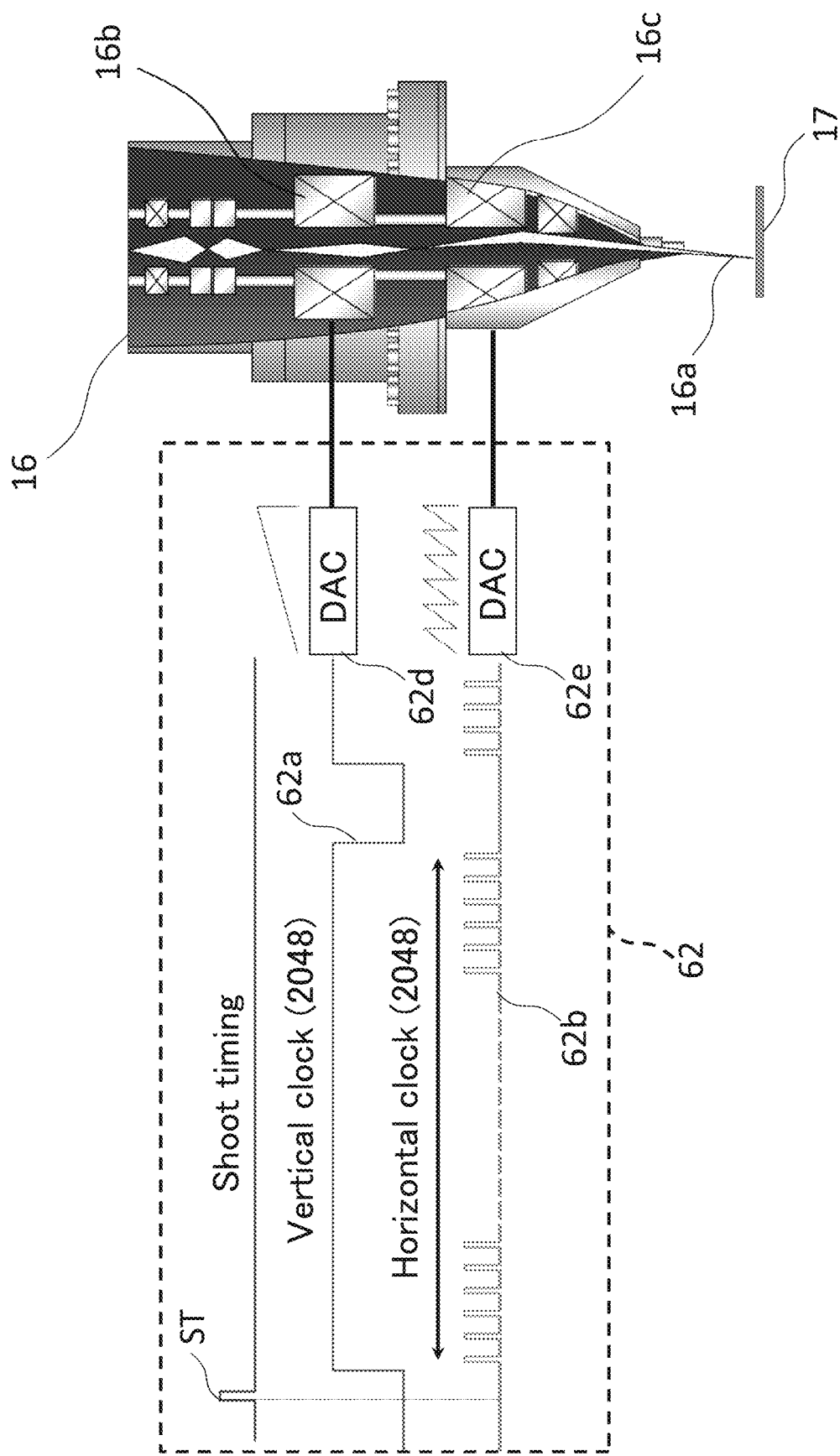
FIG. 7 is a schematic diagram showing the relation between electron beam scanning and two-dimensional measurement of an ESD image.

The structure and behavior of the control unit 50 of the hydrogen permeation and diffusion path measurement device 10 will then be described in further detail. The block diagrams in FIGS. 5 and 6 show the structure of the control unit 50 and the electron-stimulated desorption overall control unit 52, and FIG. 7 shows the relation between the scanning of the electron source 16 and the two-dimensional measurement of the ESD image. As shown in FIG. 5, the control unit 50 includes an electron microscope overall control unit 51 for controlling the scanning electron microscope 15 and an electron-stimulated desorption overall control unit 52 for obtaining an ESD image. In addition to the electron microscope overall control unit 51, the control unit 50 includes a secondary electron detecting unit 53 for acquiring a scanning electron microscopic image (SEM image) of the sample 17, an electron optics system control unit 54, an image operating unit for SEM 55, a high-voltage stabilization power supply 56, an input device 57, a display 58, a memory unit 59, etc. The electron microscope overall control unit 51 controls the secondary electron detecting unit 53, the electron optics system control unit 54, the image operating unit for SEM 55, the high-voltage stabilization power supply 56, and the memory unit 59. The output from the secondary electron detector 18 disposed within the analysis chamber 11 of the scanning electron microscope 15 is input into the secondary electron detecting unit 53.

The electron-stimulated desorption overall control unit 52 controls the acquisition of ESD images, and includes, as shown in FIG. 6, a two-dimensional multichannel scaler 60, a pulse counter 61, a synchronization control unit 62, a unit for sorting measured signals to two-dimensional surface 63, a microprocessor 72, etc. The output from the hydrogen ion detector 20 arranged within the analysis chamber 11 is input into the pulse counter 61 as output 67a via the electron-stimulated desorption ion detecting unit 67. To the electron-stimulated desorption overall control unit 52, the scanning signals are input from the electron optics system control unit 54, and controlled in synchronization with the SEM image. Furthermore, to the electron-stimulated desorption control unit 52, the display 65 and the memory unit 66 are connected.

The microprocessor 72 may be a microcomputer such as microcontroller, etc., personal computer, or a field-programmable gate array (FPGA), which is a gate array programmable on site.

The scanning signal input from the electron optics system control unit 54 to the electron-stimulated desorption overall control unit 52 as shown in FIG. 5 is input into a first deflection coil 16b of the electron source 16 as a vertical scanning signal 62a via the synchronization control unit 62 as shown in FIG. 6. The horizontal scanning signal 62b from the synchronization control unit 62 is output to a second deflection coil 16c of the electron source 16. The information on scanning position 62c from the synchronization control unit 62 is output to the microprocessor 72. The hydrogen ion count signal 61a from the pulse counter 61 is output to the microprocessor 72 as hydrogen ion count signal at each scanning position. The ESD image created at the microprocessor 72 is output to the display 65 via the input-output interface (I/O) 72a, and also output to the memory unit 66 via the input-output interface (I/O) 72b.

The behavior of the electron-stimulated desorption overall control unit 52 will then be described.

As shown in FIG. 7, the electron beam 16a generated from the electron source 16 is scanned in the horizontal and vertical directions while passing through the first deflection coil 16b and the second deflection coil 16c, and is emitted two-dimensionally to the sample 17.

The clock signal of the vertical scanning signal 62a, which is a digital signal generated at the synchronization control unit 62 as shown in FIG. 7, is converted to a sawtooth wave by the digital-analog converter (DAC) 62d, and applied to the first deflection coil 16b of the electron source 16. Similarly, the clock signal of the horizontal scanning signal 62b, which is also a digital signal, is converted to a sawtooth wave by the digital-analog converter (DAC) 62e, and applied to the second deflection coil 16c of the electron source 16.

The control is started by one-pulse shoot timing signal (ST signal) so that the vertical scanning signal (vertical clock) generates 2048 pulses in total. During the pulse width of one-pulse vertical scanning signal, pixel signals in the horizontal direction (horizontal clock) are output by 2048 pulses in total. Approximately 4.19-million-pixel two-dimensional scanning (2048 lines×2048 columns=4194304) is thus generated. In other words, by synchronizing multiple counters including the ST signal, the clock signal for vertical scanning, and the clock signal for horizontal scanning, the signals counted by the pulse counter 61 can be acquired as the count of hydrogen ions from the ion detector 23 at each scanning position.

How to acquire the ESD image will then be described.

Figure 8:
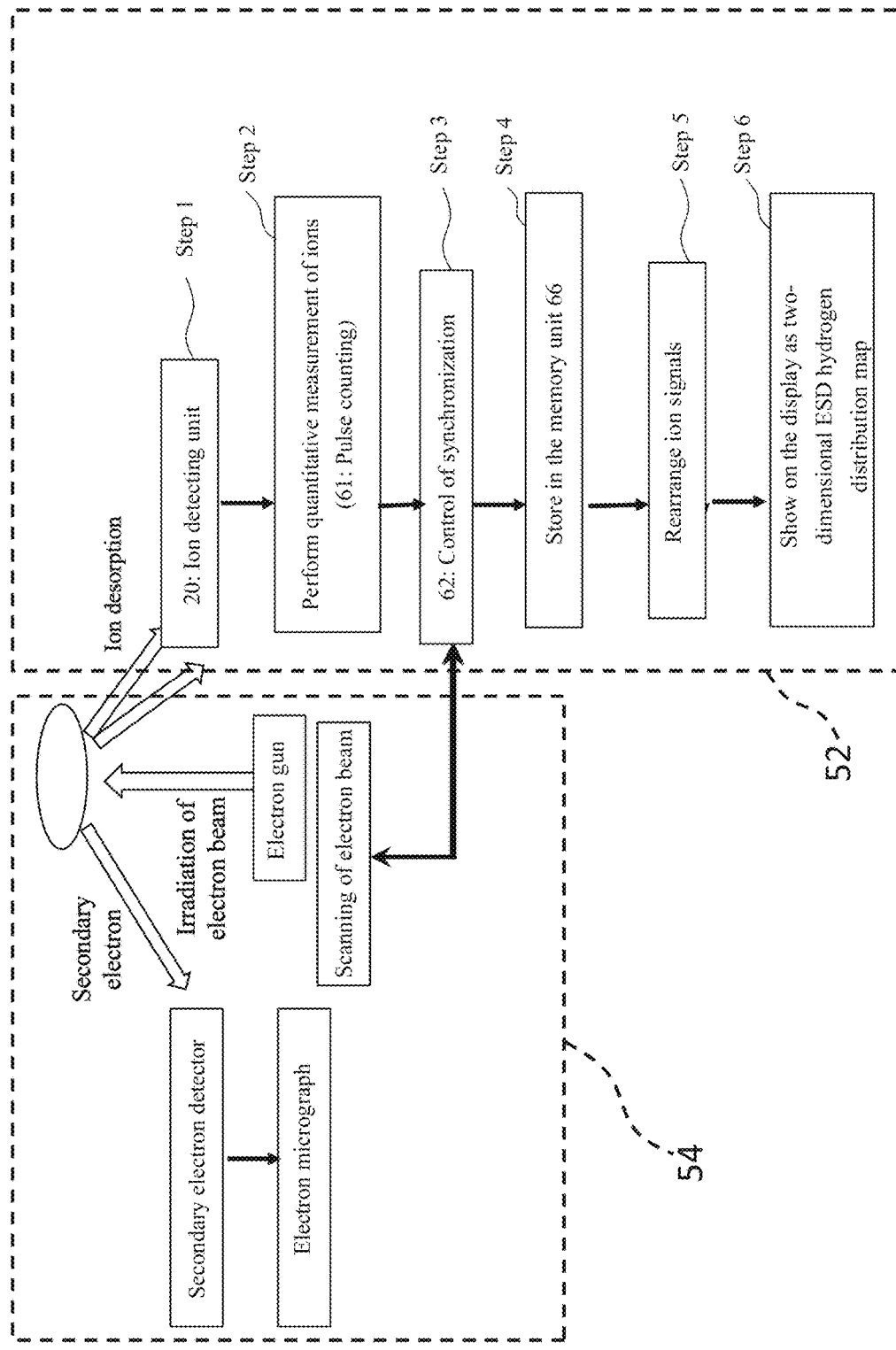
FIG. 8 is a flow chart for measuring a two-dimensional ESD image by scanning of an electron beam.

FIG. 8 is a flow chart for measuring a two-dimensional ESD image by scanning. As shown in FIG. 8, the two-dimensional ESD image can be obtained by following steps as shown below:

Step 1: Hydrogen ions detached from the surface of the sample 17 are detected by the ion detector 23.

Step 2: Quantitative measurement of hydrogen ions detected by the ion detector 23 is performed by the pulse counter 61.

Step 3: By the synchronization control unit 62, which generates clock signals for vertical scanning and clock signals for horizontal scanning as shown in FIG. 7, hydrogen ions are counted at each two-dimensional measurement point of the sample 17.

Step 4: The hydrogen ion count at each two-dimensional measurement point of the sample 17 measured in step 3 is stored in the memory of the memory unit 66.

Step 5: Based on the clock signals for vertical scanning and clock signals for horizontal scanning, the ion signals stored in the memory of the memory unit 66 are rearranged as a two-dimensional image (ESD image).

Step 6: The ESD image obtained in step 5 is shown on the display 65, and stored in the memory unit 66 as image and count data.

The ESD image in the same region as the SEM image can thus be obtained.

The ESD image obtained by following the above steps from 1 to 6 can be executed by using software created in a program creation environment dedicated to measuring instrument control. As such software, LabVIEW (registered trademark) by National Instruments Corp. (http://www.ni-.com/labview/ja/) can be used. The ESD image in steps from 1 to 6 as shown above can be obtained by the two-dimensional multichannel scaler 60 executed in the microprocessor 72 by the program created by LabVIEW.

With the hydrogen permeation and diffusion path observation device 10, the SEM image can be obtained just as in the conventional way. The signal from the secondary electron detector 18 is detected by the secondary electron detecting unit 53 of the control unit 50, and is displayed on the display 58 by the electron microscope overall control unit 51.

According to the hydrogen permeation and diffusion path observation device 10, by comparing the secondary electron-based SEM image and the ESD image of the sample 17 obtained in step 6 as shown above, for example, it would become possible to examine the relationship between the local structure of the microstructure of the sample 17 made of metal for example and the hydrogen permeation. For example, as a local structure, crystal grain size as well as crystalline structure can be compared with hydrogen permeation, namely hydrogen discharge capability.

In this case, sine the spatial resolution at the hydrogen discharge position essentially depends on the magnification of the scanning electron microscope 15, the spatial resolution can be improved to the same level as the magnification of the scanning electron microscope 15. The resolution of 50 nm or lower, 2 to 10 nm for example, namely 10 nm or lower, can thus be obtained. The limitation of the magnification of the scanning electron microscope 15 is determined by the removal of vibration of the scanning electron microscope 15 and surrounding area as well as electron beam diameter.

Furthermore, to allow detection of hydrogen ions to conform to the limitation of the secondary electron detection of the scanning electron microscope 15, the difference in flying time between electrons and hydrogen ions becomes a problem. However, by delaying the time of electron scanning during measurement, or by shortening the distance between the ion detector 23 and the sample 17, the problem can be solved.

The sample holder 30 in the embodiment of the present invention and the hydrogen permeation and diffusion path measurement device 10 that uses this sample holder 30 are configured as described above, and the detection of hydrogen permeation through the sample 17 mounted to the sample holder 30 is performed as follows: First, the material that is to become the sample 17 is made into a thin plate, and the sample 17 is fabricated by mirror-polishing its front and back surfaces. The mirror polishing of the front face of the sample 17 is necessary to detect hydrogen ions, and that of the back surface of the sample 17 is required to allow the back surface to contact the sealing member 32 made of the elastomer seal for evacuation. The retainer plate 33 is placed on the front face of the holder body 31 of the sample holder 30 while holding down the sample 17 from above the sealing members 32. In this state, the retainer plate 33 is made to abut against the front face of the holder body 31 via the insulation bushing 31a, and fastened using screws, for example. The feed pipe 13 and the exhaust pipe 14 for electrolyte 34 are then connected to the sample holder 30, and at the same time, the wiring on the −side 19a and the +side 19b of the bias voltage application wiring 19 are respectively connected to the retainer plate 33 and the opposing electrode 36. Furthermore, the cover member 37 is mounted to the back surface of the holder body 31.

From this state, the sample holder 30, to which the sample 17 has been mounted, is placed on the sample stage 24 provided within the analysis chamber 11 of the scanning electron microscope 15.

The analysis chamber 11 is then evacuated to the ultra-high vacuum by the evacuation unit 27, and the region 32c between the two O-rings 32a, 32b of the sealing members 32 is differentially evacuated via the differential exhaust pipe 35.

The inside of the analysis chamber 11 and the whole sample holder 30 are then subjected to the baking process. This baking process is performed at a temperature of approximately 120° C. for approximately 24 hours, for example, to heat and degas the part that becomes ultra-high vacuum state.

The electrolyte 34 is then fed to the hollow part 31b provided within the holder body 31 of the sample holder 30 through the feed pipe 13, and discharged through the exhaust pipe 14. The electrolyte 34 is thus circulated within the hollow part 31b.

By feeding a bias voltage between wiring 19a, 19b of the bias voltage application wiring 19, the bias voltage is applied between the retainer plate 33 and the opposing electrode 36 within the hollow part 31b, the electrolyte 34 existing between them is electrolyzed, and hydrogen ions are generated. The hydrogen ions are attracted toward the retainer plate 33, which is the bias voltage application electrode, causing the hydrogen ions to be introduced into the sample 17, diffuse within the sample 17, and discharge the hydrogen ions from its surface.

By irradiating the hydrogen having reached the surface of this sample 17 with the electron beam 16a using the electron source 16, the hydrogen ions are desorbed from the sample 17 by electron-stimulated desorption (ESD). The desorbed hydrogen ions are collected by the collecting mechanism 21 and detected by the hydrogen ion detector 20, and thus the ESD image is obtained. This allows the control unit 50 to investigate the relationship between the local structure of the microstructure of the sample 17 and the hydrogen permeation by comparing the secondary electron-based SEM image and the ESD image.

Regarding the detection of hydrogen permeation through the sample 17, the hydrogen gas has conventionally been used to cause hydrogen permeation. However, according to the present invention, by generating hydrogen by electrolysis of the electrolyte 34, the electrochemical charge is used to allow hydrogen to permeate the sample 17. Consequently, the amount of introduction of hydrogen into the sample 17 increases significantly, by hundredfold, for example. Therefore, at the time of detection of hydrogen permeation, the intensity of hydrogen signal increases, shortening the measurement time required for hydrogen permeation and diffusion path measurement and improving the signal-to-noise (S/N) ratio significantly. Since the amount of hydrogen introduced to the sample 17 increases, the present invention is also applicable to samples whose hydrogen permeation cannot be detected with the conventional method of introducing hydrogen using hydrogen gas to detect hydrogen permeation.

Figure 9:
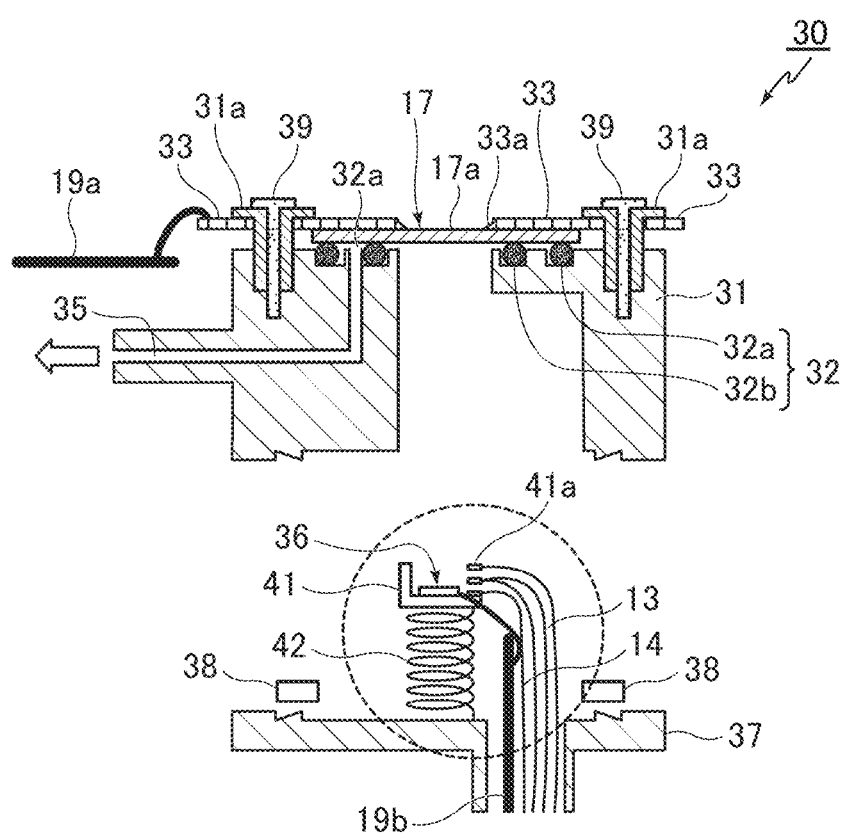
FIG. 9 is a schematic cross-sectional view showing a second embodiment of the sample holder by breaking it down.

FIG. 9 shows a second embodiment of the sample holder 40 according to the present invention.

Figure 3A:
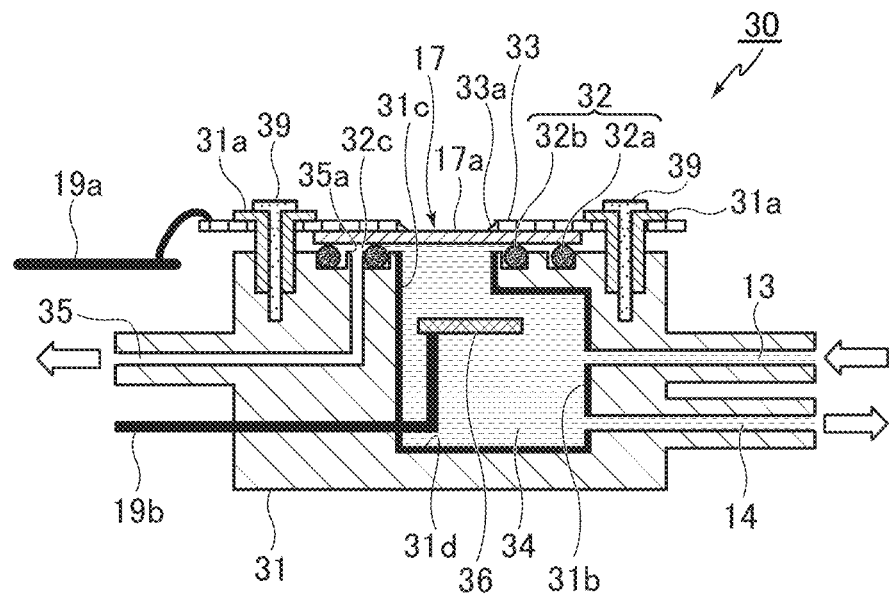
FIG. 3A is a schematic cross-sectional view showing a first embodiment of the sample holder.
Figure 3B:
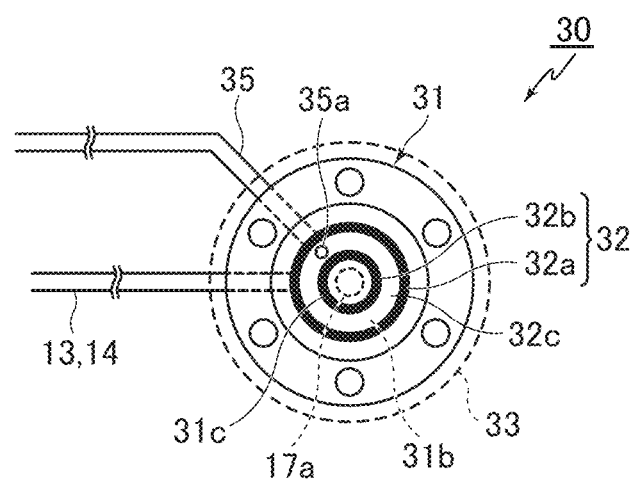
FIG. 3B is a plan view showing the sample holder in FIG. 3A by omitting a part of the holder.

As shown in FIG. 9, the structure of the sample holder 40 differs from that of sample holder 30 as shown in FIGS. 3A and 4, in that the sample holder 40 is provided with a vessel 41, which abuts against the back surface of the sample 17 within the hollow part 31b provided in the holder body 31, and that the opposing electrode 36 is arranged on the bottom surface of the vessel 41.

The vessel 41 is made of a glass beaker, for example, so that its top edge 41a becomes open, and the open top edge 41a abuts against the back surface of the sample 17, creating an electrolyte introduction chamber 41c for housing the electrolyte 34 inside. At that time, the top edge 41a and the back surface of the sample 17 are wetted with the electrolyte 34 housed within, and tightly closed by surface tension.

Also, the bottom face of the vessel 41 is supported by a cover plate 37 via an elastic member, a spring member 42 made of a coil spring in FIG. 9, which allows the cover plate 37 to be mounted to the back surface of the holder body 31 while the spring member 42 is being compressed. In this state, the top edge 41a of the vessel 41 is biased upwards from the spring member 42, and is compressed against the back surface of the sample 17, and is attached liquid-tightly by so-called surface tension.

Figure 10:
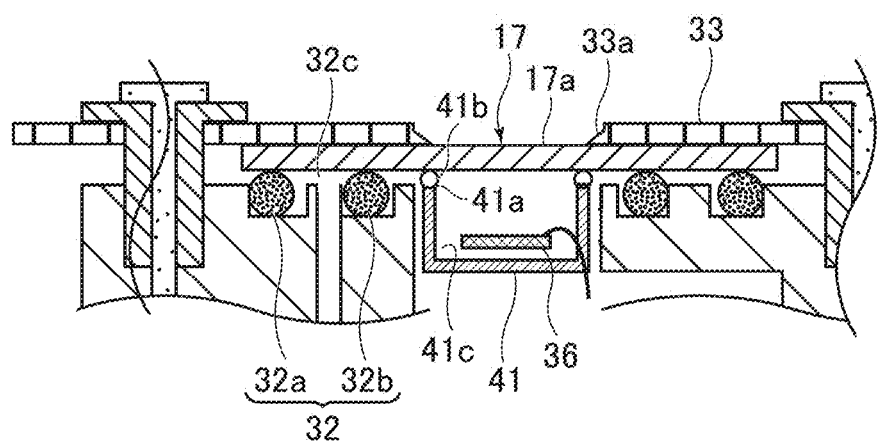
FIG. 10 is a partially enlarged cross-sectional view of a major part of the sample holder shown in FIG. 9.

In this case, the diameter of the vessel 41 is set to be larger than the diameter of the through-hole 33a of the retainer plate 33 (diameter of approximately 4 to 7 mm, for example). Therefore, as shown in FIG. 10 in detail, the top edge 41a of the vessel 41 abuts against the back surface of the sample 17 in a region corresponding to the outside of the through-hole 33a of the retainer plate 33, which does not allow load to be applied to the sample 17. Furthermore, the top edge 41a of the vessel 41 may be made to abut against the back surface of the sample 17 via an elastomer 41b. The elastomer 41b can be attached to the top edge 41a of the vessel 41 by using an adhesive agent, etc.

The feed pipe 13, the exhaust pipe 14, and the wiring on the +side 19b of the wiring for bias voltage application electrode 19 are connected to the vessel 41. In this case, since the area surrounding the vessel 41 is not a vacuum environment, the feed pipe 13 and the exhaust pipe 14 may be vinyl pipes, and as the wiring 19b, a coated wire can be used, which decreases the cost.

The electrolyte introduction chamber 41c is defined by the vessel 41, back surface of the sample 17, and the inner face of the O-ring 32a on the inner side of the sealing members 32, and the electrolyte 34 is supplied to this electrolyte introduction chamber 41c. Consequently, the amount of electrolyte 34 supplied to the electrolyte introduction chamber 41c is small. That is why the amount of hydrogen that permeates the sample holder 40 is small compared to the sample holder 30 shown in FIGS. 3A and 4. It is therefore appropriate for the case where the supply of hydrogen from a small amount of electrolyte 34 is sufficient. When the vessel 41 is a glass beaker, the insulation and the anticorrosion coating 31d of the hollow part 31b is unnecessary, unlike the sample holder 30 as shown in FIGS. 3A and 4. When the vessel 41 is made of metal, the internal surface of the vessel 41 only requires the insulation and the anticorrosion coating to prevent the corrosion of the vessel 41 caused by contact with the electrolyte 34, which decreases the cost.

Figure 11:
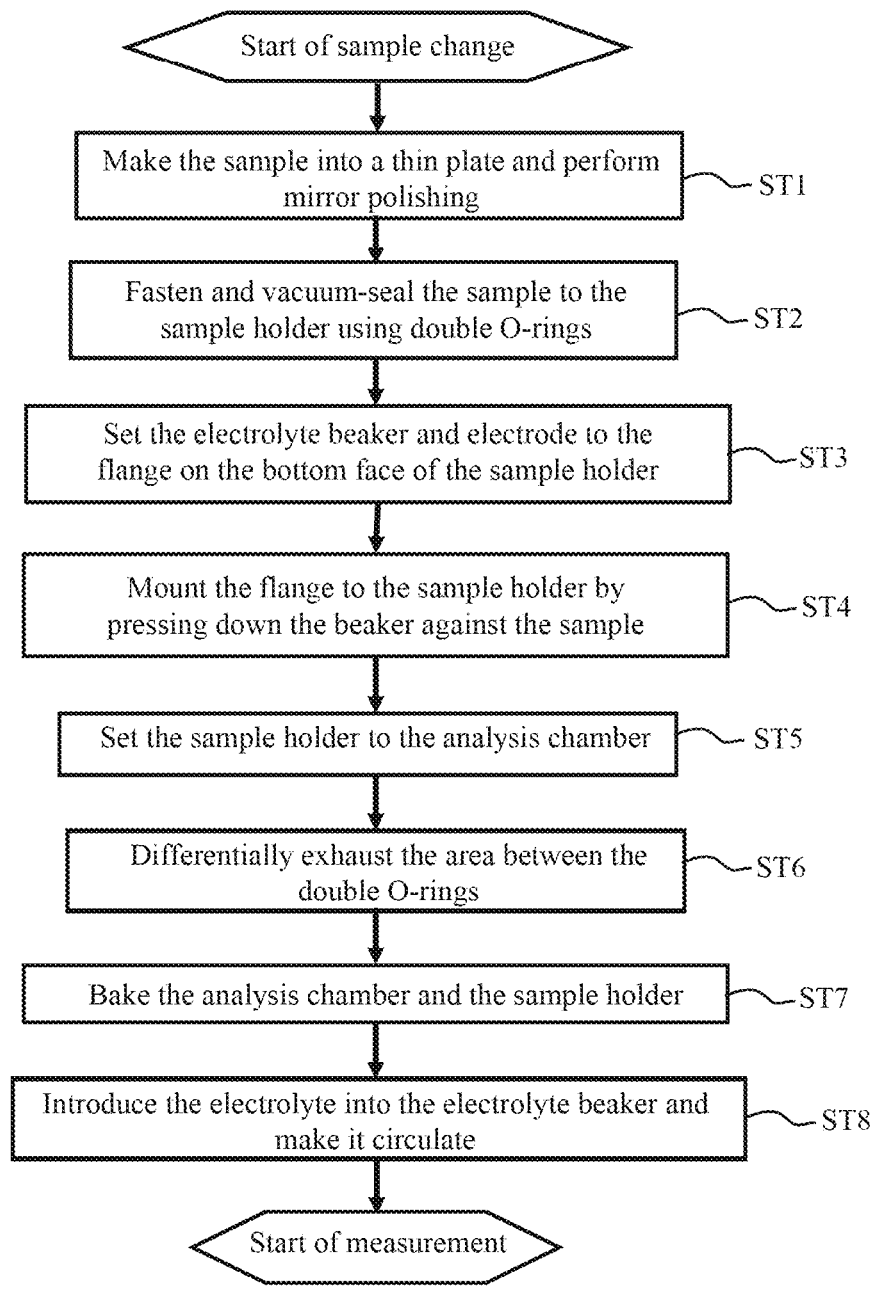
FIG. 11 is a flow chart sequentially showing the preparation work process for detecting permeation of hydrogen through the sample with the hydrogen permeation and diffusion path observation device by using the sample holder shown in FIG. 9.

With the sample holder 40 of the configuration described above, by placing the sample on the sample stage 24 within the analysis chamber 11 of the hydrogen permeation and diffusion path measurement device 10, as in the case of the sample holder 30 described above, the preparation work ranging from the replacement of the sample 17 to the hydrogen permeation detection of the sample 17 is performed according to the flow chart as shown in FIG. 11.

Specifically, in Step ST1 in FIG. 11, the material for the sample 17 is made into a thin plate, and the sample 17 is fabricated by mirror-polishing its front and back surfaces. In step ST2, the sample 17 is placed on the double sealing members 32 on the surface of the holder body 31 of the sample holder 40, and in a state where the retainer plate 33 is placed while the sample 17 is sandwiched from above the sealing members 32, the retainer plate 33 is made to abut against the surface of the holder body 31 of the sample holder 40 via the insulation bushing 31a, and fastened by using screws, for example. In this state, the region 32c between the two O-rings 32a, 32b as the sealing members 32 is differentially exhausted via the differential exhaust pipe 35 to fasten and vacuum-seal the sample 17.

Then in step ST3, the vessel 41 and the opposing electrode 36 are attached to the surface of the cover member 37 of the sample holder 40 via the spring member 42. In step ST4, the cover member 37 is then mounted to the back surface of the holder body 31 of the sample holder 40 so as to have the vessel 41 abut against the sample 17.

Then in step ST5, the sample holder 40 is placed on the sample stage 24 of the analysis chamber 11 of the scanning electron microscope 15, and in step ST6, the region 32c between the double sealing members 32 is exhausted differentially through the differential exhaust pipe 35. In step ST7, the inside of the analysis chamber 11 and the entire sample holder 40 are made to undergo baking process, and in step ST8, the electrolyte 34 is supplied to the vessel 41 through the feed pipe 13 and at the same time the electrolyte 34 is discharged from the exhaust pipe 14. The vessel 41 is thus filled with the electrolyte, and the preparation for the detection of hydrogen permeation is complete.

From this state, as same as in the case of the sample holder 30, the bias voltage is applied between the retainer plate 33 and the opposing electrode 36 by the bias voltage application wiring 19 to generate hydrogen ions by electrolysis. Those hydrogen ions are attracted toward the retainer plate 33, which serves as the bias voltage application electrode. The hydrogen ions are thus introduced into and diffused in the sample 17, and discharged from the sample 17. By irradiating the discharged hydrogen with the electron beam 16a to allow the hydrogen ions to desorb from the sample 17 by ESD, and detecting those hydrogen ions, the ESD image can be obtained. By comparing this ESD image and secondary electron-based SEM image, the relationship between the local structure of the microstructure of the sample 17 and hydrogen permeation can be examined.

Figure 12:
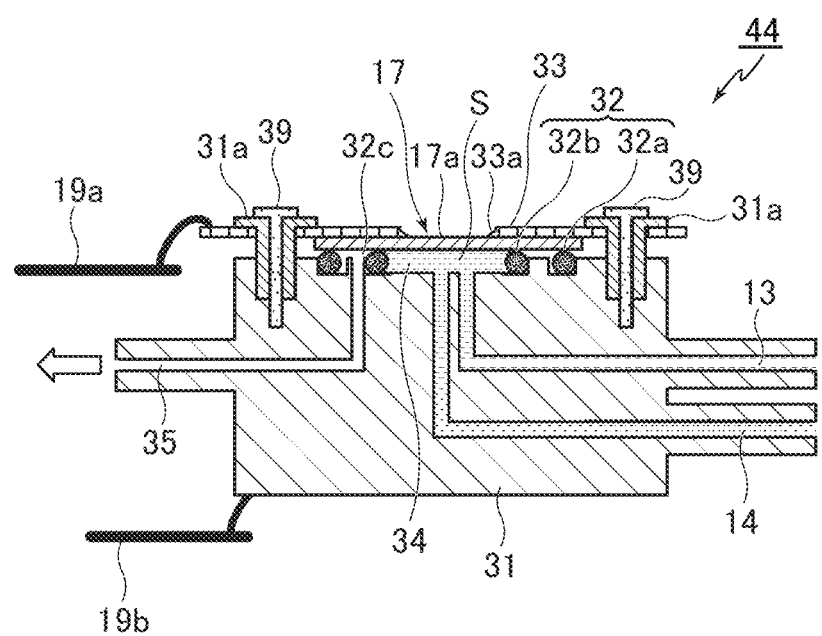
FIG. 12 is a schematic cross-sectional view of a third embodiment of the sample holder.

FIG. 12 shows the configuration of a third embodiment of a sample holder 44 according to the present invention. Unlike the sample holder 30 as shown in FIGS. 3A and 4, this sample holder 44 omits the hollow part 31b of the holder body 31. This holder body 31 is made of a conductive material, and serves as the opposing electrode 36 by connecting the wiring on the +side 19b of the bias voltage application wiring 19 to the holder body 31. It is desirable that the surface of the holder body 31 that contacts the electrolyte 34 be provided with the insulation and the anticorrosion coating.

In this case, the electrolyte introduction chamber S, to which the electrolyte 34 is supplied, is defined by the surface of the holder body 31, back surface of the sample 17, and the O-ring 32b on the inside of the double sealing members 32. Also, the feed pipe 13 and the exhaust pipe 14 for the electrolyte 34 are open to the region inside of the inner O-ring 32b on the surface of the holder body 31. The electrolyte 34 is thus fed to the above-mentioned electrolyte introduction chamber S from outside via the feed pipe 13 and discharged to outside via the exhaust pipe 14.

By applying the bias voltage between the retainer plate 33 and the holder body 31 from each wiring 19a, 19b of the bias voltage application wiring 19, the electrolyte 34 within the above-mentioned electrolyte introduction chamber S undergoes electrolysis, generating hydrogen, which is introduced into and diffuses within the sample 17, and is discharged from its surface.

As same as in the case of the sample holder 30 as shown in FIGS. 3A and 4, by irradiating the hydrogen that has reached the surface of the sample 17 with the electron beam 16a by the electron source 16, hydrogen ions desorb from the sample 17 by ESD. Those hydrogen ions are collected by the collecting mechanism 21, detected by the hydrogen ion detector 20, and the ESD image is obtained. By comparing the secondary electron-based SEM image and the ESD image with the control unit 50, the relation between the local structure of the microstructure of the sample 17 and hydrogen permeation can be examined.

In this case, since the volume of the electrolyte introduction chamber 8, to which the electrolyte 34 is supplied, is smaller than that of the vessel 41 of the sample holder 40 as shown in FIG. 9, it is appropriate for a sample 17 with further reduced hydrogen permeation, wherein the supply of hydrogen from a small amount of electrolyte 34 is sufficient. Also, the holder body 41 can be downsized, and since it is made of a conductive material, it can serve as the opposing electrode, which simplifiers the overall structure.

Figure 13:
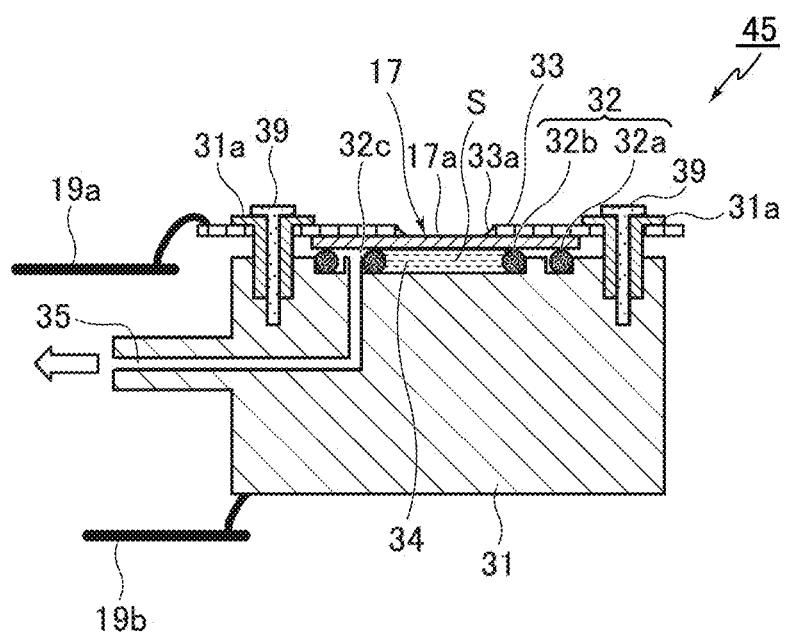
FIG. 13 is a schematic cross-sectional view of a fourth embodiment of the sample holder.

FIG. 13 shows the structure of a fourth embodiment of a sample holder 45 according to the present invention. Unlike the sample holder 44 as shown in FIG. 12, the sample holder 45 omits the supply pipe 13 and the exhaust pipe 14. The electrolyte 34 is sealed into the electrolyte introduction chamber S when the sample 17 is set. With this device, the electrolyte 34 is not circulated during electrolysis, and it is appropriate for a sample 17 with further reduced hydrogen permeation, wherein the supply of hydrogen from a small amount of electrolyte 34 within the electrolyte introduction chamber S is sufficient. Here, it is desirable that the surface of the holder body 31 that contacts the electrolyte 34 be provided with insulation and anticorrosion coating.

Furthermore, since the feed pipe 13 and the exhaust pipe 14 are unnecessary, the holder body 31 can be further downsized, and the structure simplified, which decreases the parts and assembly costs. Since the sample holder 45 is mounted to the opening of the diaphragm of the analysis chamber 11 of the scanning electron microscope 15 in a state where the electrolyte 34 is enclosed in the electrolyte introduction chamber S, the sample holder 45 cannot endure baking process. It is therefore possible to use the sample holder 45 for a sample 17 wherein the sample holder 45 does not need to undergo baking process. For example, in the case of a scanning electron microscope 15 provided with a spare exhaust chamber, so-called load lock chamber allowing sample change, the sample holder 45 that does not require baking can be used.

The present invention can be carried out in various embodiments without departing from the scope of the present invention. In the embodiments described above, the sample 17 is made of a conductive material such as steel and stainless steel, for example. However, it is obvious that the materials are not limited to those and can also be made of an insulating material.

REFERENCE SIGNS LIST

10: Hydrogen permeation and diffusion path observation device
11: Analysis chamber
11a: Conducting wire draw-out port
13: Feed pipe
14: Exhaust pipe
15: Scanning electron microscope
16: Electron source
17: Sample
17a: Measurement region
18: Secondary electron detector
19: Bias voltage feed wiring
19a: Wiring on the side
19b: Wiring on the side
20: Hydrogen ion detector
21: Collecting mechanism
22: Ion energy decomposing unit
23: Ion detector
24: Sample stage
25: Sample position adjusting unit
26: Sample temperature measuring unit
27: Evacuation unit
29: Mass analyzer
30, 40, 44, 45: Sample holder
31: Holder body
31a: Insulation bushing
31b: Electrolyte introduction chamber (hollow part)
31c: Opening
31d: Insulation and anticorrosion coating
32: Double sealing members
32a, 32b: Ring
32c: Region between double sealing members
33: Retainer plate (bias voltage application electrode)
33a: Through-hole
34: Electrolyte
35: Differential exhaust pipe
35a: Opening
36: Opposing electrode
37: Cover member
38: Ultra-high vacuum seal
39: Screw
41: Vessel
41a: Top edge of the vessel
41b: Elastomer
41c: Electrolyte introduction chamber
42: Spring member
50: Control unit
51: Electron microscope overall control unit
52: Electron-stimulated desorption overall control unit
53: Secondary electron detecting unit
54: Electron optics system control unit
55: Image operating unit for SEM
56: High-voltage stabilization power supply
57: Input device
58, 65: Display
59, 66: Memory unit
60: Two-dimensional multi-channel scaler
61: Pulse counter
61a: Hydrogen ion count signal
62: Synchronization control unit
62a: Vertical scanning signal
62b: Horizontal scanning signal
62c: Information on scanning position
62d, 62e: Digital-analog converter 63: Unit for sorting measured signals to two-dimensional surface
67: Electron-stimulated desorption ion detecting unit
72: Microprocessor
72a, 72b: Input-output interface
5: Electrolyte introduction chamber

What is claimed is:

1. A sample holder for detection of hydrogen permeation, comprising:
   a holder body to be mounted to a scanning electron microscope for holding a sample to detect hydrogen ions generated by an electron beam irradiation;
   an electrolyte introduction chamber provided with an opening that opens to a measurement region of the sample;
   a retainer plate, which is provided with a through-hole corresponding to the measurement region of the sample, for retaining the sample from an electron source side of the scanning electron microscope around the through-hole to hold the sample airtightly against the holder body;
   double sealing members arranged between a surface of the holder body and the sample so as to surround the periphery of the measurement region of the sample;
   a differential exhaust pipe, which opens to a space between the double sealing members on the surface of the holder body, for exhaust from the opening; and
   electrodes made up of a bias application electrode and an opposing electrode for electrolysis, wherein
   the retainer plate is made of a conductive material as the bias application electrode,
   the opposing electrode is disposed within the electrolyte introduction chamber, or the holder body is made to serve as the opposing electrode, and
   a voltage is applied between the bias application electrode and the opposing electrode to introduce hydrogen from the electrolyte into the sample.

2. The sample holder for detection of hydrogen permeation as set forth in claim 1, wherein the electrolyte introduction chamber is comprised of an opening that opens to the surface of the holder body and a hollow part that extends from the opening toward inside of the holder body, and the opposing electrode is disposed inside the hollow part.

3. The sample holder for detection of hydrogen permeation as set forth in claim 2, wherein an internal surface of the hollow part is provided with an insulation and an anticorrosion coating.

4. The sample holder for detection of hydrogen permeation as set forth in claim 1, wherein the electrolyte introduction chamber is defined by a back surface of the sample, an inner sealing member of the double sealing members, and the surface of the holder body.

5. The sample holder for detection of hydrogen permeation as set forth in claim 4, wherein the opposing electrode is connected to the holder body.

6. The sample holder for detection of hydrogen permeation as set forth in claim 1, wherein a feed pipe for supplying electrolyte to the electrolyte introduction chamber and an exhaust pipe for discharging the electrolyte are provided.

7. The sample holder for detection of hydrogen permeation as set forth in claim 6, wherein the electrolyte is supplied through the feed pipe and at the same time used electrolyte is discharged through the exhaust pipe during electrolysis.

8. The sample holder for detection of hydrogen permeation as set forth in claim 6, wherein air bubbles generated during electrolysis are discharged through the exhaust pipe.

9. The sample holder for detection of hydrogen permeation as set forth in claim 1, wherein the holder body, the opposing electrode, the electrolyte introduction chamber, and sealing members are respectively made of a material that can endure a baking process.

10. The sample holder for detection of hydrogen permeation as set forth in claim 1, wherein the holder body is made of a conductive material, serves as the opposing electrode, and is electrically insulated from the retainer plate.

11. The sample holder for detection of hydrogen permeation as set forth in claim 1, wherein
   the hollow part opens to a back surface side of the holder body, and an open end of the back surface side is sealed by a cover member via an ultrahigh-vacuum seal,
   a vessel that serves as the electrolyte introduction chamber is supported by an elastic member on a front side of the cover member, and
   an open top end of the vessel abuts against a back surface of the sample within the sealed hollow part by a biasing force of the elastic member.

12. The sample holder for detection of hydrogen permeation as set forth in claim 1, wherein an opening is absent from the space other than the opening of the differential exhaust pipe.

13. A hydrogen permeation and diffusion path observation device, comprising:
   a scanning electron microscope for detecting secondary electrons generated by irradiating a sample with an electron beam within an analysis chamber;
   a sample holder for detection of hydrogen permeation that is mounted to the scanning electron microscope to hold the sample, the sample having a measurement region for detecting hydrogen ions generated by the electron beam irradiation, and
   a hydrogen ion detector for detecting hydrogen ions generated by the electron beam shot on hydrogen that is discharged to a surface from a back face of the sample held by the sample holder, wherein
   the sample holder comprises a holder body, a retainer plate for holding the sample from a surface side of the holder body, a differential exhaust pipe that opens to a space between sealing members on the surface of the holder body and communicates with outside, and electrodes made up of a bias application electrode and an opposing electrode for electrolyzing the electrolyte,
   the holder body comprises:
   an electrolyte introduction chamber having an opening that opens at least to the measurement region of the sample;
   electrolyte that fills the electrolyte introduction chamber up to a back surface of the sample; and
   double sealing members disposed on a surface of the sample holder body so as to surround the periphery of the measurement region of the sample,
   the retainer plate is provided with a through-hole that corresponds to the measurement region of the sample, presses down the sample from an electron source side around the periphery of the through-hole, and thus sandwiches the sample air-tightly between the sample holder and the double sealing members,
   the entire electrolyte introduction chamber is sealed in a state where the electrolyte has been introduced to the electrolyte introduction chamber and the sample is mounted to the sample holder, the retainer plate is made to serve as a bias application electrode, and the opposing electrode is disposed in the electrolyte introduction chamber, or the holder body is made to serve as the opposing electrode, a voltage is applied between the bias application electrode and the opposing electrode to cause electrolysis to occur, and by irradiating the hydrogen discharged to a surface from the back surface of the sample held by the sample holder with the electron beam, hydrogen ions generated by the electron beam are measured by the hydrogen ion detector.

14. The hydrogen permeation and diffusion path observation device as set forth in claim 13, wherein an opening is absent from the space other than the opening of the differential exhaust pipe.

* * * * *